United States Patent
Chen et al.

(10) Patent No.: US 11,093,832 B2
(45) Date of Patent: Aug. 17, 2021

(54) PRUNING REDUNDANT NEURONS AND KERNELS OF DEEP CONVOLUTIONAL NEURAL NETWORKS

(71) Applicant: International Business Machines Corporation, Armonk, NY (US)

(72) Inventors: Chun-Fu Chen, Mount Kisco, NY (US); Jui-Hsin Lai, White Plains, NY (US); Ching-Yung Lin, Scarsdale, NY (US); Guangnan Ye, Scarsdale, NY (US); Ruichi Yu, Greenbelt, MD (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 15/788,523

(22) Filed: Oct. 19, 2017

(65) Prior Publication Data
US 2019/0122113 A1 Apr. 25, 2019

(51) Int. Cl.
*G06N 3/08* (2006.01)
*G06N 3/04* (2006.01)

(52) U.S. Cl.
CPC ............ *G06N 3/082* (2013.01); *G06N 3/04* (2013.01); *G06N 3/084* (2013.01)

(58) Field of Classification Search
CPC .......... G06N 3/04; G06N 3/082; G06N 3/084
See application file for complete search history.

(56) References Cited

U.S. PATENT DOCUMENTS

| | | | |
|---|---|---|---|
| 9,396,415 B2 | 7/2016 | Chertok et al. | |
| 9,400,955 B2 | 7/2016 | Garimella | |
| 2016/0019456 A1 | 1/2016 | Annapureddy | |
| 2016/0162782 A1 | 6/2016 | Park | |
| 2016/0189218 A1 | 6/2016 | Kota | |
| 2016/0217369 A1 | 7/2016 | Annapureddy et al. | |
| 2016/0259980 A1 | 9/2016 | Mlybari et al. | |
| 2018/0114114 A1* | 4/2018 | Molchanov | G06N 3/082 |

OTHER PUBLICATIONS

Luo, J. H., Wu, J., & Lin, W. Thinet: A filter level pruning method for deep neural network compression. arXiv:1707.06342v1. Jul. 2017. (Year: 2017).*
Molchanov, P., Tyree, S., Karras, T., Aila, T., & Kautz, J. Pruning convolutional neural networks for resource efficient inference. arXiv: 1611.06440v2. Jun. 2017. (Year: 2017).*
Li, H., Kadav, A., Durdanovic, I., Samet, H., & Graf, H. P. Pruning filters for efficient convnets. arXiv: 1608.08710v2. Mar. 2017. (Year: 2016).*
Simonyan, K., Vedaldi, A. & Andrew Zisserman, A. (2013). Deep Inside Convolutional Networks: Visualising Image Classification Models and Saliency Maps.
IBM T.J. Watson Research Center, "A Method for Pruning Redundant Neurons and Kernels of Deep Convolutional Neural Networks," Jul. 14, 2016, 20 pages.

* cited by examiner

*Primary Examiner* — Benjamin P Geib
(74) *Attorney, Agent, or Firm* — Patterson + Sheridan, LLP

(57) ABSTRACT

Method and apparatus for optimizing a convolutional neural network (CNN). A respective measure of importance is calculated for each of a plurality of elements within a CNN. A first one of the measures of importance is calculated by back propagating a second one of the measures of importance through the CNN. One or more of the plurality of elements is pruned from the CNN, based on the calculated measures of importance.

20 Claims, 5 Drawing Sheets

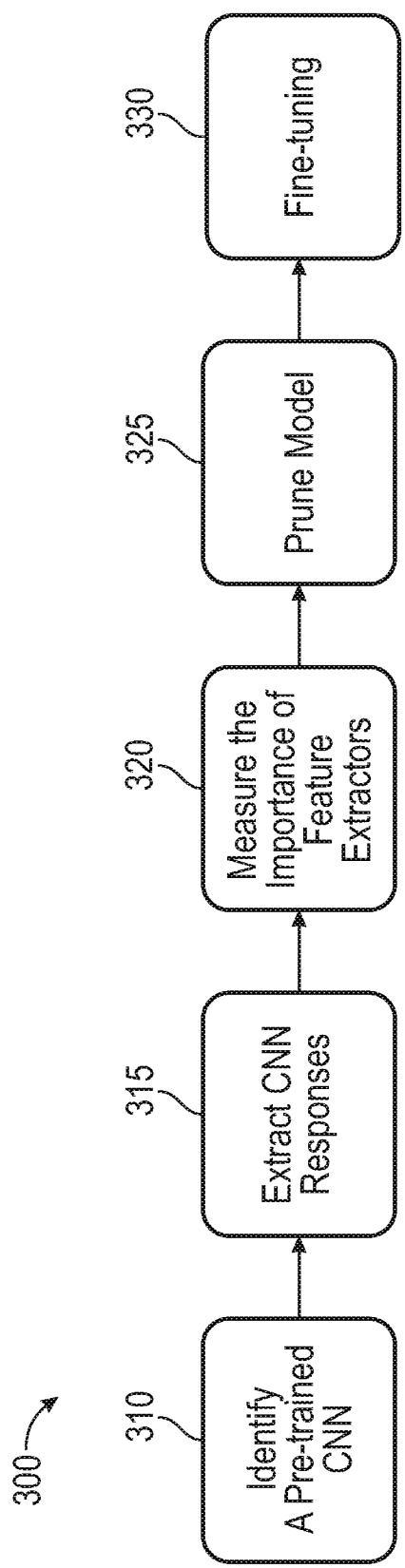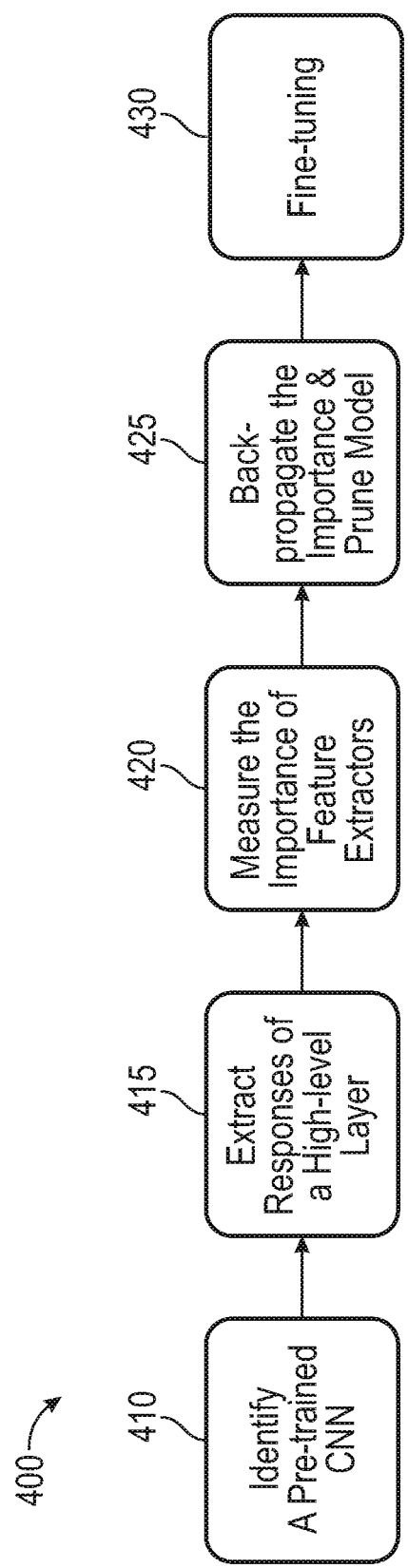

PRUNING REDUNDANT NEURONS AND KERNELS OF DEEP CONVOLUTIONAL NEURAL NETWORKS

BACKGROUND

The present invention relates to neural networks, and more specifically, to techniques for selectively pruning neurons and kernels of deep convolutional neural networks.

Neural networks are simplified models of the brain comprising units associated by weighted connections. A weight on a connection reveals the strength of the connection. Neural networks have demonstrated an ability to learn such skills as face recognition, reading, and the detection of simple grammatical structure. More particularly, neural networks can be considered to be models defining a multivariate function or a distribution over a set of discrete classes. In some instances, neural network models can be associated with a particular learning method or learning rule.

The use of neural networks for machine learning tasks, including acoustic modeling for speech recognition, is well known. The ability to train increasingly deep networks has been due, in part, to the development of pre-training algorithms and forms of random initialization, as well as the availability of faster computers.

SUMMARY

Embodiments provide a method, system and computer-readable storage medium for optimizing a convolutional neural network (CNN). The method, system and computer-readable storage medium include calculating a respective measure of importance for each of a plurality of elements within a CNN. A first one of the measures of importance is calculated by back propagating a second one of the measures of importance through the CNN. The method, system and computer-readable storage medium also include pruning one or more of the plurality of elements from the CNN, based on the calculated measures of importance.

BRIEF DESCRIPTION OF THE SEVERAL VIEWS OF THE DRAWINGS

FIG. 3 is a flow diagram of a CNN, according to one embodiment described herein.

FIG. 4 is a flow diagram illustrating a method of optimizing a CNN through the use of back-propagation of importance scores, according to one embodiment described herein.

DETAILED DESCRIPTION

Figure 1:
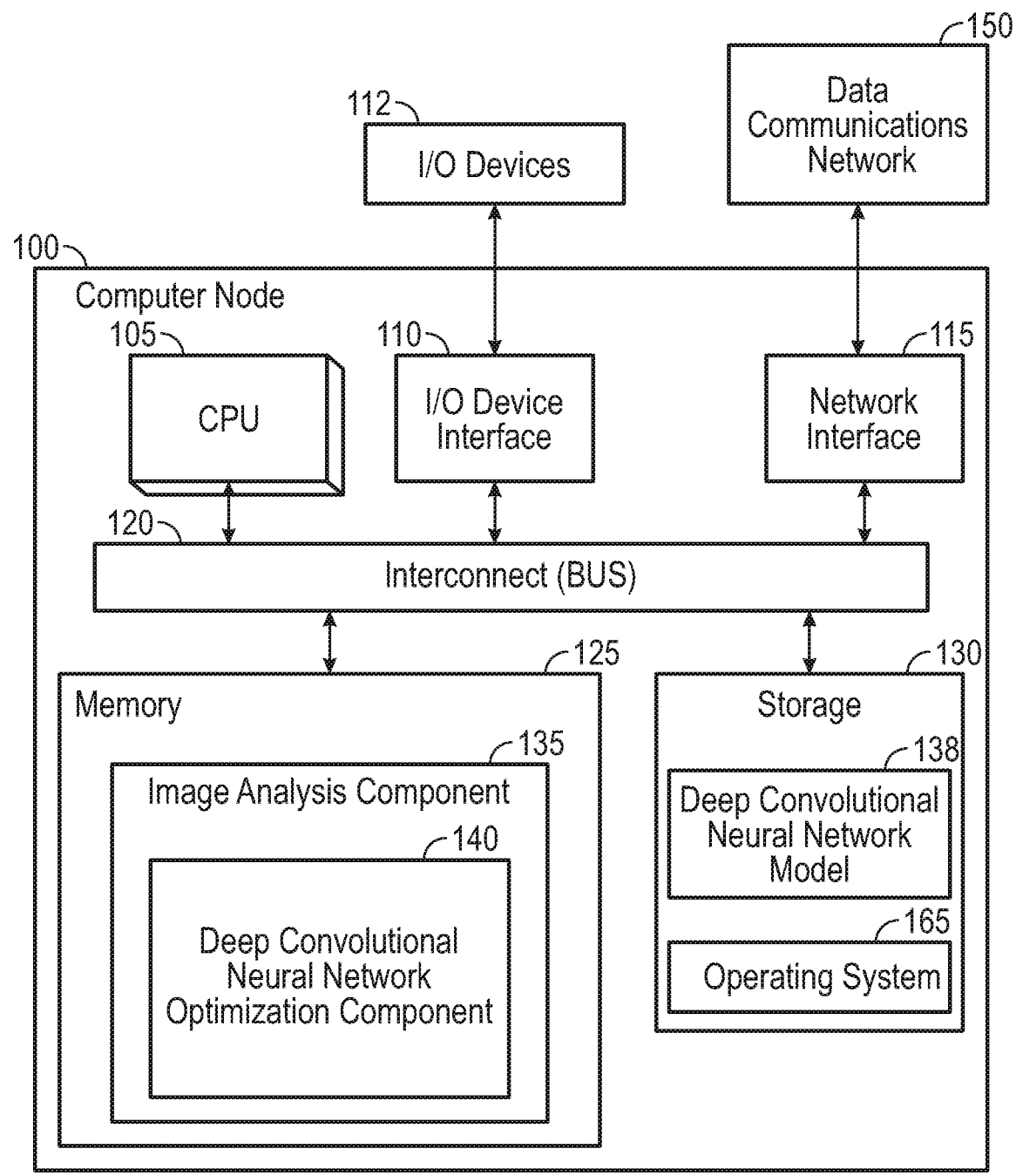
FIG. 1 is a more detailed view of a compute node configured with a deep convolutional neural network optimization component, according to one embodiment described herein.

Convolutional Neural Networks (CNNs) have achieved state-of-the-art performance for many computer vision tasks, such as image classification, object detection, autonomous driving, etc. Nonetheless, the impressive predictive power of CNNs comes with large amounts of parameters and high computational cost in both training and testing phases. Various techniques have been employed to demonstrate the significant redundancy in the parameterization of such deep learning models, such as examining the sparsity of weights and compressed CNNs by combining pruning, quantization, and Huffman coding. Additional techniques have reduced computations in convolutional layers by exploiting the spatial redundancy, while other techniques leveraged the cross-channel redundancy and achieved speedup by using low-rank approximation based methods.

While such techniques have exploited the redundancy of CNNs, these techniques have deficiencies as well. For example, many such techniques improve the speed of CNNs by approximating operations, without taking into account whether it is fundamentally feasible to learn a compact network that is much smaller than the original CNN, but is similar in performance with regard to predicting capability by exploiting the redundancy of the overly redundant network. Additionally, many techniques focus either on convolutional layers or FC layers, and while some techniques can achieve speedup on both layer types, they ignore other layer types, such as pooling, non-linearity, normalization, etc., which account for nearly 20% of the entire testing time of modern CNNs such as AlexNet.

As such, embodiments described herein provide a fundamental processing flow to improve the parameterization of a CNN. According to one embodiment, the importance of convolutional kernels and neurons is learned, and the less important kernels and neurons are then pruned accordingly, resulting in only a minimal loss to prediction accuracy. Embodiments described herein can directly reduce the redundancy of a CNN to obtain a compact but powerful CNN model. As a result, embodiments can achieve full-network compression and speedup simultaneously. Moreover, embodiments can directly obtain a smaller CNN structure, rather than compressing the CNN based on approximating its operations.

Given an effective structure of a CNN model with fixed type of each layer, the number of convolutional kernels and neurons in FC layers are hyper-parameters that are defined empirically. Generally speaking, the large number of kernels and neurons are one of the essential reasons that contribute to the redundancy of CNNs. Although one can arbitrarily change those hyper-parameters empirically, the process is ad-hoc without theoretical guidance, and it requires plenty of efforts on designing and tuning. On the contrary, by viewing an end-to-end CNN as two parts: feature extraction (convolutional layers and some of the FC layers) and classification (loss layer and the final FC layer), kernels and neurons in the first part can be considered feature extractors.

As such, embodiments described herein provide general processing flow that includes quantifying the importance of the features of convolutional kernels and neurons for each layer of a pre-trained CNN model, and further includes pruning the less important extractors to obtain a compact CNN structure. In such an embodiment, the remaining extractors (i.e., the more important extractors) provide a better initialization of the smaller CNN. Moreover, the resulting CNN generally outperforms CNNs with the identical model structure but trained from scratch or pruned randomly. To analyze the importance of feature extractors in each layer, embodiments utilize feature selection methods to rank the importance of kernels and neurons by jointly considering the discrimination and correlation of one extractor to the others.

FIG. 1 is a more detailed view of a compute node 100 configured with a deep convolutional neural network optimization component, according to one embodiment described herein. The compute node 100 can include, without limitation, one or more processors (CPUs) 105, a network interface 115, an interconnect (BUS) 120, a memory 125, and a storage 130. The compute node 100 can also include an I/O device interface 110 used to connect I/O devices 112, e.g., keyboard, display, and mouse devices, to the compute node 100. In some embodiments, the compute node 100 represents a particular compute instance of a single computing device (e.g., computing components within a chassis, a blade within a blade server, an I/O drawer, a processor chip, etc.). Alternatively, the compute node 100 can represent an entire computing device that includes one or more processors and one or more associated memory devices.

Each CPU 105 retrieves and executes programming instructions stored in the memory 125 or storage 130. Similarly, the CPU 105 stores and retrieves application data residing in the memory 125. The interconnect 120 is used to transmit programming instructions and application data between each CPU 105, I/O device interface 210, storage 130, network interface 115, and memory 125. The interconnect 120 can be one or more busses. The CPUs 105 can be a single CPU, multiple CPUs, or a single CPU having multiple processing cores in various embodiments. In one embodiment, a processor 105 can be a digital signal processor (DSP).

The memory 125 is generally included to be representative of a random access memory, e.g., Static Random Access Memory (SRAM), Dynamic Random Access Memory (DRAM), or Flash. The storage 130 is generally included to be representative of a non-volatile memory, such as a hard disk drive, solid state device (SSD), or removable memory cards, optical storage, flash memory devices, network attached storage (NAS), or connections to storage area network (SAN) devices, or other devices that can store non-volatile data. The network interface 115 is configured to transmit data via the communications network 150.

The compute node 100 can include one or more operating systems. An operating system can be stored partially in memory 125 and partially in storage 130. Alternatively, an operating system can be stored entirely in memory 125 or entirely in storage 130. The operating system provides an interface between various hardware resources, including the CPU 105, I/O device interface 110, network interface 115 and so on. In addition, an operating system provides common services for application programs, such as providing a time function.

The deep convolutional neural network (DCNN) optimization component 140 is generally configured to optimize the structure of the trained DCNN model 138. In order to achieve a balance between the predictive power and model redundancy of CNNs, the DCNN optimization component 140 can learn the importance of convolutional kernels and neurons in FC layers from feature selection perspective. The DCNN optimization component 140 can optimize a CNN by pruning less important kernels and neurons based on their importance scores. The DCNN optimization component 140 can further fine-tune the remaining kernels and neurons to achieve a minimum loss of accuracy in the optimized DCNN. To measure importance scores over the entire DCNN efficiently and consistently, the DCNN optimization component 140 can utilize Importance Score Back Propagation, which enables one-time feature ranking on a high-level layer of the DCNN and back propagates the importance calculations to the lower layers of the DCNN.

Figure 2:
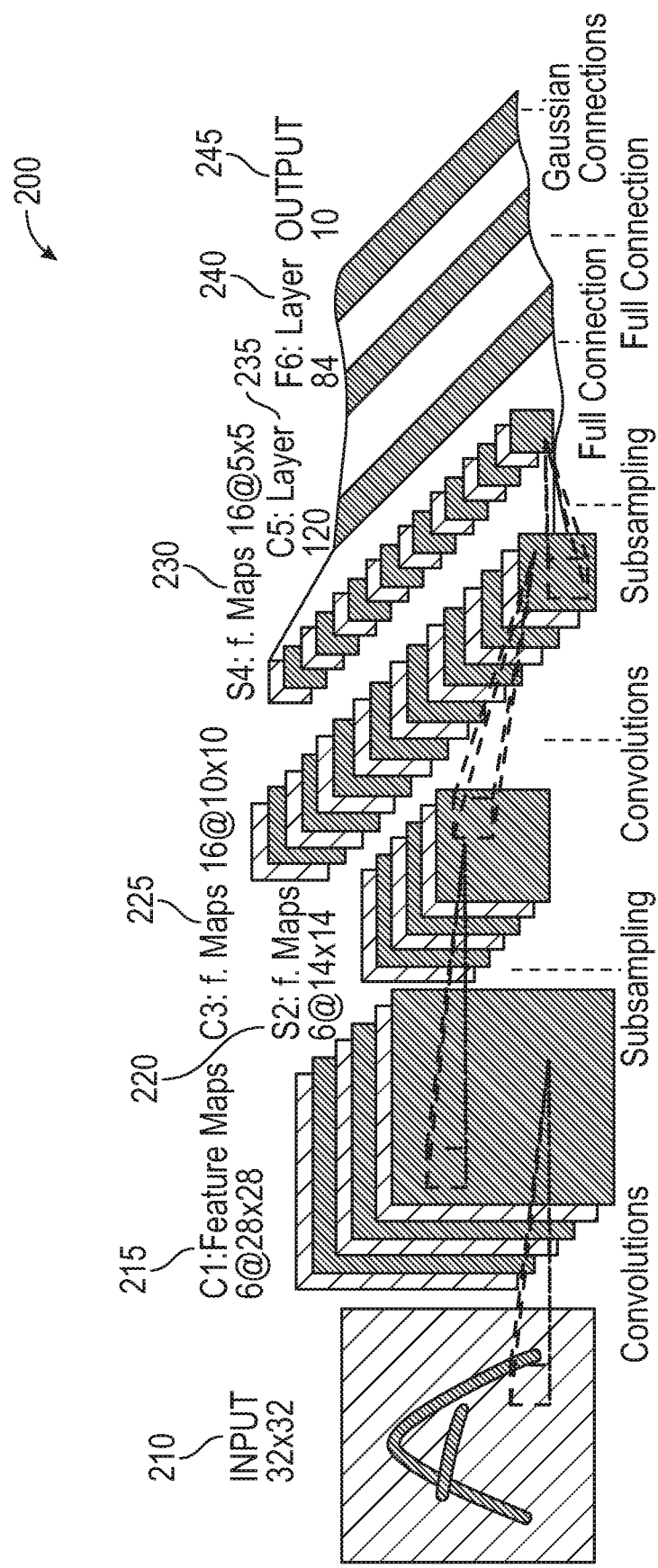
FIG. 2 illustrates a convolutional neural network, according to one embodiment described herein.

FIG. 2 illustrates a convolutional neural network, according to one embodiment described herein. As shown, the CNN 200 includes an input layer 210, a convolutional layer 215, a subsampling layer 220, a convolutional layer 225, subsampling layer 230, fully connected layers 235 and 240, and an output layer 245. The input layer 210 in the depicted embodiment is configured to accept a 32×32 pixel image. The convolutional layer 215 generates 6 28×28 feature maps from the input layer, and so on. While a particular CNN 200 is depicted, more generally a CNN is composed of one or more convolutional layers, frequently with a subsampling step, and then one or more fully connected layers. Generally, the CNN architecture is designed to take advantage of the two-dimensional structure of an input image (or other two-dimensional input, e.g., a speech signal). For example, CNNs may achieve this using local connections and tied weights followed by some form of pooling, resulting in translation invariant features. Generally, CNNs may be easier to train and tend to have fewer parameters, relative to fully connected networks with a similar number of hidden units.

Generally, a CNN includes convolutional and subsampling layers, which may be followed by fully connected layers. According to one embodiment, the CNN is configured to accept an x by y by z image as input at a convolutional layer of the CNN, where x and y represent the height and width of the image, and z represents the number of channels in the image. For example, an RGB image would have z=3 channels. The convolutional layer may include k filters (or kernels) of size a by b by c, where a by b is smaller than x by y, and c is less than or equal to z (and may vary for various kernels). Generally, the size of filters k leads to a locally connected structure, which is convolved with the image to produce k feature maps. Additionally, each map can be subsampled over contiguous regions of various sizes (e.g., 2×2 may be appropriate for small images, while up to 5×by 5 may be appropriate for larger images). In some embodiments, an additive bias and sigmoidal nonlinearity is applied to each feature map (e.g., prior or subsequent to the subsampling layer). Any number of fully connected layers may follow the convolutional layers.

As discussed above, typical CNNs consist of convolutional (Conv) layer, pooling layer, non-linear layer (e.g. ReLU), normalization layer (e.g. local response normalization (LRN)) and fully connected (FC) layer, etc. The convolutional layer generally includes a set of trainable kernels, which extract local features from a small spatial region but cross-depth volume of the input tensor. Each kernel can be trained as a feature extractor for some specific visual features, such as an edge or a color in the first layer, or a paw-like or ball-like pattern in higher layers. In FC layers, neurons can be fully connected to all activations in the previous layer. Although an end-to-end CNN can solve a classification task directly by mapping an input to a probability distribution over all classes, intermediate features from FC layers or Cony layers can be extracted to train other specific classifiers.

A direct way of reducing the redundancy of a CNN is pruning kernels of convolutional layers and neurons in the FC layers. Although model redundancy generally increases the generality of a CNN model, a selective reduction in the CNN's redundancy can properly reduce its redundancy, a balance between a model's predictive power, inference speed, memory usage, storage space and power consumption can be achieved. Although it is beneficial to prune kernels and neurons, trivial methods like randomly pruning or changing the number of neurons and kernels arbitrarily may result in huge degradation of predictive power.

From the perspective of feature extraction, kernels and neurons of a CNN model can be viewed as feature extractors. As such, when facing with high dimensional features, the DCNN optimization component 140 can employ a feature selection process to individuate irrelevant and/or redundant features and avoid overfitting. Generally, applying feature selection/ranking methods on the extracted features will imply the importance of each feature extractor and allow the DCNN optimization component 140 to prune less important ones to achieve the balance between predictive power and model redundancy of the CNN model. That is, the DCNN optimization component 140 can prune a CNN model based on the importance of each feature extractor. In doing so, the DCNN optimization component 140 can extract responses of each convolutional and FC layer and rank the kernels and neurons by their importance from feature selection perspective, and then prune less important ones. The DCNN optimization component 140 can also use the selected important feature extractors as the initialization of the smaller CNN and conduct fine-tuning with a smaller learning rate to recover the predictive power.

One obstacle in optimizing a CNN by selectively pruning kernels and neuros is that the dimensionality of the features extracted by convolutional layers and FC layers are usually huge. For example, with an AlexNet CNN, the dimensionality of the first FC layer's output can be approximately 4K, while dimensionality of the flattened output from the first convolutional layer can be more than 290K. Furthermore, there can be a substantial number (e.g., millions) of training images in a modern dataset. Applying feature selection on features of each layer within a CNN is computationally expensive, or nearly intractable. Meanwhile, feature selection methods are typically applied on 1D feature vectors, and it is sub-optimal to apply feature selections on the flattened feature vectors from 3D tensors extracted by convolutional layer. Additionally, independently ranking feature extractors in each layer of a CNN may result in error propagation in deep neural networks.

Accordingly, DCNN optimization component 140 can perform Importance Score Back Propagation (ISBP) for optimizing a CNN. In one embodiment, the DCNN optimization component 140 can apply feature ranking on higher level features of the CNN, e.g. the inputs of the classifier. The DCNN optimization component 140 can then back-propagate the importance scores to the lower layers of the CNN. Through the use of ISBP, the DCNN optimization component 140 can efficiently measure the importance of feature extractors of an entire deep neural network and can do so consistently across the network.

FIG. 3 is a flow diagram illustrating an example of a CNN, according to one embodiment described herein. As shown, the method 300 begins at block 310, where the DCNN optimization component 140 identifies an already trained CNN (e.g., DCNN model 138). The DCNN optimization component 140 then extracts CNN responses from the trained CNN (block 315) and calculates an importance score for each of the feature extractors (block 320). Generally, there are three major categories in feature selection: (i) wrappers, which score a subset of features using classifiers; (ii) embedded methods, which implicitly select the features in the learning process of the classifier by regularization methods; and (iii) filter methods, which exploit intrinsic properties of data, with regardless of the classifiers. In one embodiment, the DCNN optimization component 140 is configured to perform feature selection based on the responses of a pre-trained model. In a particular embodiment, the DCNN optimization component 140 uses the Infinite Feature Selection (Inf-FS) filter algorithm to conduct feature ranking. Generally, when performing Inf-FS analysis, the DCNN optimization component 140 maps the feature selection problem to an affinity graph, where each vertex is one feature, and an edge between vertices is the relationship, whose weight is defined by a function of the variance and correlation of the vertex pair. Each path (a collection of vertices and edges) in graph is considered as a feature subset, and the cost of the path is sum of edge weights. Therefore, when performing an Inf-FS analysis, the DCNN optimization component 140 evaluates the importance of a given feature while considering all the possible subsets of features so that the score of each feature is influenced by all other ones.

In the method 300, the DCNN optimization component 140 measures the importance of the feature extractors (block 320). For example, the DCNN optimization component 140 can consider the output of the Inf-FS analysis as the importance score of each feature. In one embodiment, the responses of each neuron or each position's value is computed by convolutions. The DCNN optimization component 140 can map the importance of feature extractors by leveraging the weights of a CNN. For a neuron A, we back propagate the neuron's importance score to the neurons in the previous layer that are either fully connected (FC) layers or locally connected (convolutional layers) to A, proportionally to the weights of the connections. Given the importance score vector ISFC for neurons in a FC layer, the DCNN optimization component 140 can prune neurons based on the ranks.

Of note, while examples provided herein are with respect to 3-way tensors that are square spatially, more generally the techniques described herein can be extended to other configurations as well. For a convolutional layer with output tensor size Y×Y×F, where Y is the spatial size and F is the number of output channels, the DCNN optimization component 140 can first obtain the importance score $IS_{ijf}$ for each position of the $f^{th}$ output channel with spatial position (i, j). In one embodiment, the DCNN optimization component 140 calculates the importance score for the $f^{th}$ output channel using the Equation 1, shown below.

Importance Score
$$IS_f = \sum_{i,j} IS_{ijf}$$
Equation 1

Once the importance scores are calculated, the DCNN optimization component 140 can prune the less important kernels based on the ranks of importance score of output channels (block 325). In one embodiment, the pruning ratios used by the DCNN optimization component 140 are determined by predefined hyper-parameters that can be balanced between classification performance and model redundancy. The DCNN optimization component 140 can then perform any needed fine tuning operations on the reduced CNN (block 330), and the method 300 ends.

FIG. 4 is a flow diagram illustrating a method of optimizing a CNN through the use of back-propagation of importance scores, according to one embodiment described herein. As shown, the method 400 begins at block 410, where the DCNN optimization component 140 identifies a trained CNN. The DCNN optimization component 140 extracts responses of a high-level layer of the CNN (block 415) and measures the importance of the feature extractors for the CNN (block 420). For example, the DCNN optimization component 140 could calculate an importance score using Equation 1, discussed above. The importance scores could be used to selectively prune kernels and neurons of the CNN (e.g., starting at the high-level layer).

Additionally, in the depicted embodiment, the DCNN optimization component 140 back propagates the importance scores of the selected feature extractors to the previous layers (block 425). In doing so, the DCNN optimization component 140 can ignore any already pruned neurons and kernels. For network structures without a FC layer before the final classifier (e.g., some CNN structures defined for the CIFAR10 dataset), the DCNN optimization component 140 can perform feature selection on the flattened responses of the last convolutional layers. The DCNN optimization component 140 then performs any fine-tuning operations for the pruned CNN (block 430), and the method 400 ends.

Generally, the DCNN optimization component 140 can use importance score back propagation (ISBP) to transfer the importance from downstream kernels and neurons of the CNN to upstream kernels and neurons of the CNN, based on learned weights in CNN model. For example, given the importance score of a specific neuron, the DCNN optimization component 140 can identify the neurons in the previously used to calculate the activation of neuron, then back propagate the importance to the neurons proportionally to the weights corresponding to the operation of that layer. From the perspective of dimensionality, the DCNN optimization component 140 can be configured to consider three classes of ISBPs: (i) from a 1-way tensor to a 1-way tensor (e.g., between FC layers); from a 1-way tensor to a 3-way tensor (e.g., from a FC layer to a convolution/pooling layer); and (iii) from a 3-way tensor to a 3-way tensor (e.g., from a pooling layer to a convolutional layer). Additionally, for other layers such as a non-linearity layer (e.g., a ReLU and regularization layer, such as Dropout), the ISBP process on those layers can be simplified due to their properties. Generally, bias is not included in ISBP calculation, as there is no connection between cross-channel biases.

For a 1-way tensor to a 1-way tensor ISBP operation, given a FC layer with M input neurons and N output neurons, the 1-by-N importance score (IS) vector of the output response can be represented as $IS_{FC_{out}} = [IS_{FC_{out}1}, IS_{FC_{out}2}, \ldots, IS_{FC_{out}N}]$. The DCNN optimization component 140 can be configured to use $W_{FC} \in R^{M \times N}$ to denote the weights of the FC layer. In such an embodiment, the important score vector of the input neurons can be represented as shown in Equation 2.

$$IS_{FC_{in}} = IS_{FC_{out}} \times W_{FC}^T \quad \text{Equation 2—Importance Score Vector}$$

Considering a FC layer with a 3-way input tensor, which can be the response of a convolutional layer or a pooling layer, the size of the tensor can be represented as X×X×C, where X represents the spatial size and C represents the number of input channels. Assuming the number of neurons is represented as N, the DCNN optimization component 140 can denote the weights of the FC layer as $W_{FC} \in R^{(X \times X \times C) \times N}$. The flattened important score vector $IS_{in} \in R^{1 \times (X \times X \times C) \times N}$ of the input tensor can be calculated using Equation 3, shown below.

$$IS_{in} = IS_{FC_{out}} \times W_{FC}^T \quad \text{Equation 3—Flattened Importance Score Vector}$$

Generally, performing ISBP from 3-way tensor to 3-way tensor tends to be more complicated than the above two cases, as the operations of the forward propagation between the input and output response are manifold. As such, the DCNN optimization component 140 can be configured to use a ISBP method that is derived for convolutional layer, which tends to be the most complicated cases. The DCNN optimization component 140 can also use a ISBP method for pooling and local response normalization (LRN) that is derived similarly.

For a convolutional layer with the input 3-way tensor $Conv_{in} \in R^{X \times X \times N}$ and $Conv_{out} \in R^{Y \times Y \times F}$, the filter size can be represented as k, the stride can be represented as s and the number of padded pixels can be represented as p. During the forward propagation, for each convolution kernel $k_f \in R^{k \times k \times N}$, the DCNN optimization component 140 can compute an inner product between that kernel and the corresponding receptive cube of the input 3-way tensor to obtain an output response. The DCNN optimization component 140 can further decompose this operation into two sub-operations. Fixing input channel n and output channel f the spatial convolution kernel can be represented as $k_{fn}$. For a position i in the nth channel of the input tensor, the DCNN optimization component 140 could calculate the corresponding response of the output channel f at position i using Equation 4, shown below, where in(i) refers to the corresponding 2-D receptive field.

Output Channel Response  Equation 4

$$R_f(i) = \sum_n k_{fn} \cdot in(i)$$

Given the importance score cube of the output response $IS_{out} \in R^{Y \times Y \times F}$, and considering the symmetricity of linear computation, the DCNN optimization component 140 can perform a similar linear computation to back propagate the importance score from the output response to the input, as shown in Equation 5 below, where $IS_{in}(i)$ is the importance score of the position i in the $n^{th}$ input channel, and $IS_{out}(i)$ is the corresponding 2-D matrix that contains the output positions whose responses come from the value of that input position during forward propagation.

Backwards Propagation Importance Score  Equation 5

$$IS_n(i) = \sum_f k_{fn} \cdot IS_{out}(i)$$

The DCNN optimization component 140 can back propagate the importance of a given neuron or kernel, proportionally to the weights for the neuron or kernel within the CNN. The DCNN optimization component 140 can calculate the importance scores for positions in the input tensor, as described in Algorithm 1 below.

Algorithm 1 - Convolutional Layer
Algorithm 1 ISBP: Conv layer

```
1:   Input : weights of the Conv layer W ∈ R^(X × X × N × F)
2:   , flattened importance score of the fth output channel
3:   IS_out^f ∈ R^(1 × (X × X))
4:   for n in 1 . . . N do
5:       for f in 1 . . . F do
6:           k_fn ← W[:, :, n, f]
7:           Construct BP_conv^fn as (6) and (7)
```

-continued

Algorithm 1 - Convolutional Layer
Algorithm 1 ISBP: Conv layer

8:  $IS_{in}^{fn} \leftarrow IS_{out}^{f} \cdot BP_{conv}^{fn}$
9:  $IS_{in}^{n} \leftarrow \Sigma_f IS_{in}^{fn}$
10: $IS_{in} \leftarrow [IS_{in}^{1}, IS_{in}^{2}, \ldots, IS_{in}^{N}]$
11: end The back propagation matrices used in algorithm 1 are defined as $$BP_{conv}^{fn} = \begin{bmatrix} b_1^{fn} & \ldots & b_j^{fn} & \ldots & b_k^{fn} & & \\ & b_1^{fn} & \ldots & b_j^{fn} & \ldots & b_k^{fn} & \\ & & & \vdots & & & \\ & & b_1^{fn} & \ldots & b_j^{fn} & \ldots & b_k^{fn} \end{bmatrix},$$

where $b_c^i$ refers to the building block of size Y-by-X defined as:

$$b_i^{fn} = \begin{bmatrix} k_{fn}[i, 1] & \ldots & & \ldots & k_{fn}[i, 1] & \\ & k_{fn}[i, 1] & \ldots & & \ldots & k_{fn}[i, 1] \\ & & & \vdots & & \\ & & k_{fn}[i, 1] & \ldots & & \ldots & k_{fn}[i, k] \end{bmatrix}$$

Generally, the importance score calculation shown in Equation 5 implies that the back propagation of importance score between 3-way tensors in convolutional layer can be decomposed into back propagation between 2-D matrices. Fixing the input channel n and the output channel f the input layer size is X×X and the output size is Y×Y. Given the flattened importance score vector $IS_{out}^{f} \in R^{1 \times (Y \times Y)}$ of the output layer, the back propagation matrix $BP_{conv}^{fn} \in R^{(Y \times Y) \times (X \times X)}$ is used to map from $IS_{out}^{f}$ to the importance score of the input layer $IS_{in}^{fn} \in R^{1 \times (X \times X)}$. If $BP_{conv}^{fn}(i, j) \neq 1$, this can indicate that the $i^{th}$ position in the output layer comes from a convolution operation involving the $j^{th}$ position in the input layer. In response, the DCNN optimization component 140 can back propagate the importance score between the two positions.

Additionally, the DCNN optimization component 140 can use a Y×X matrix $b_i^{fn}$ to represent the mapping between a row in the output layer to the corresponding row in the input layer. In each row of $b_i^{fn}$, there are generally k non-zero value, since each position in the output layer is obtained from a region with width k of the input layer. The non-zero values of each row of $b_i^{fn}$ are the $i^{th}$ row of the convolution kernel $k_{fn}$. Generally, the offset of the beginning of the weights in each row is the stride s. Moreover, the entire back propagation matrix $BP_{conv}^{fn}$ can be a block matrix with each submatrix being a Y×X matrix of either $b_i^{fn}$ or a zero matrix. Each row of $BP_{conv}^{fn}$ can include $b_1^{fn}$ to $b_k^{fn}$, because the height of the convolution kernel is k. The offset of the beginning of the values in each row of the back propagation matrix can be the stride s.

Figure 5:
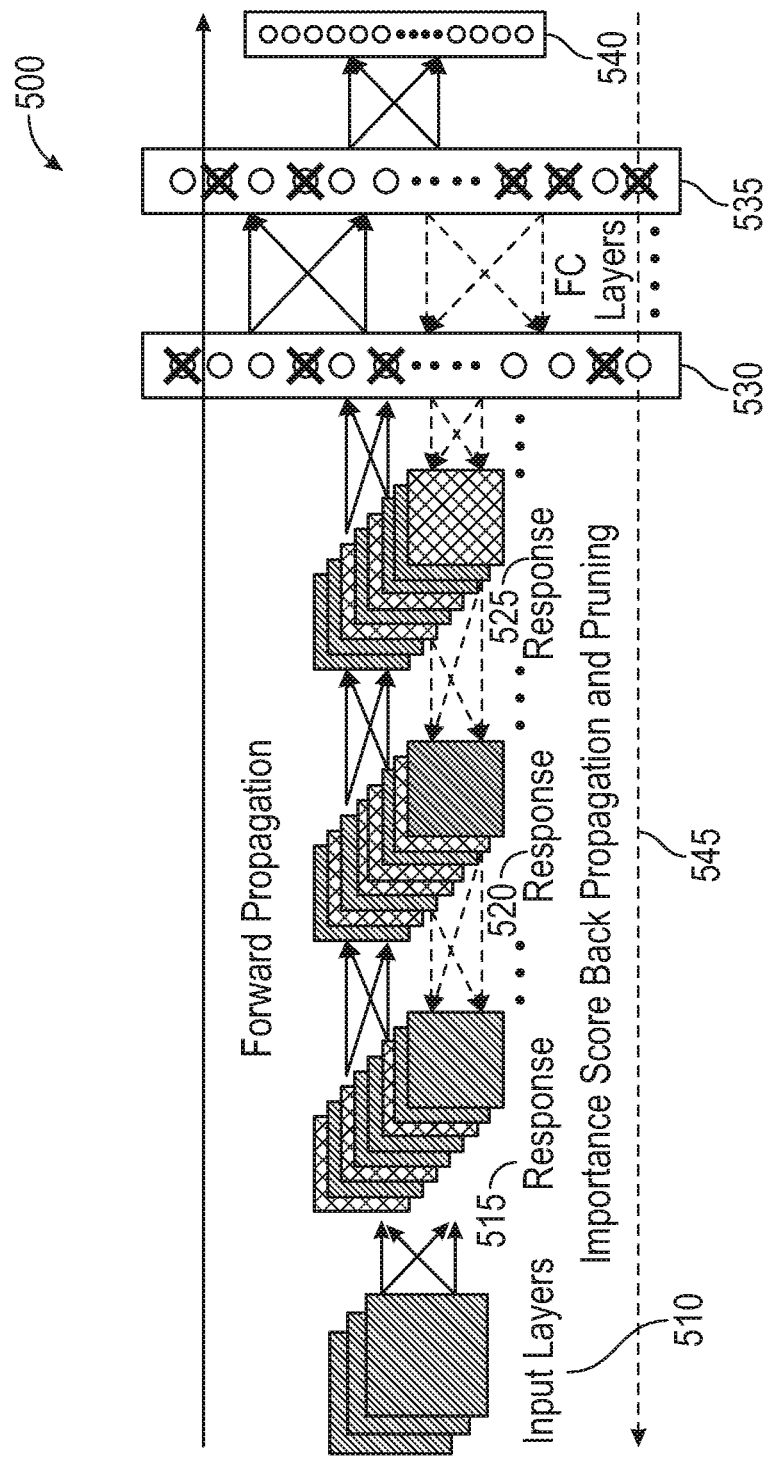
FIG. 5 is a block diagram illustrating a workflow for back propagating importance scores for use in optimizing a CNN, according to one embodiment described herein.

FIG. 5 is a block diagram illustrating a workflow for back propagating importance scores for use in optimizing a CNN, according to one embodiment described herein. As shown in the diagram 500, the DCNN optimization component 140 can begin by calculating an importance of feature extractors 540 for the depicted CNN. The importance scores for the feature extractors 540 can then be propagated backwards through the CNN and used to calculate importance scores for the FC layer 535, followed by the FC layer 530. The DCNN optimization component 140 can continue propagating the importance scores backwards through the CNN, such that the scores are used to calculate respective importance scores for the layers 525, 520, 515 and ultimately 510, as shown by the arrow 545. At each layer, the DCNN optimization component 140 can be configured to prune one or more kernels and/or neurons, based on the importance scores. For example, the DCNN optimization component 140 could be configured to prune a configurable number of neurons per layer, based on a predefined parameter. In a particular embodiment, the DCNN optimization component 140 is configured to prune any neuron or kernel having an importance score below a predefined threshold value. More generally, any manner of determining which and how many kernels and neurons to prune based on importance scores can be used, consistent with the functionality described herein.

Figure 6:
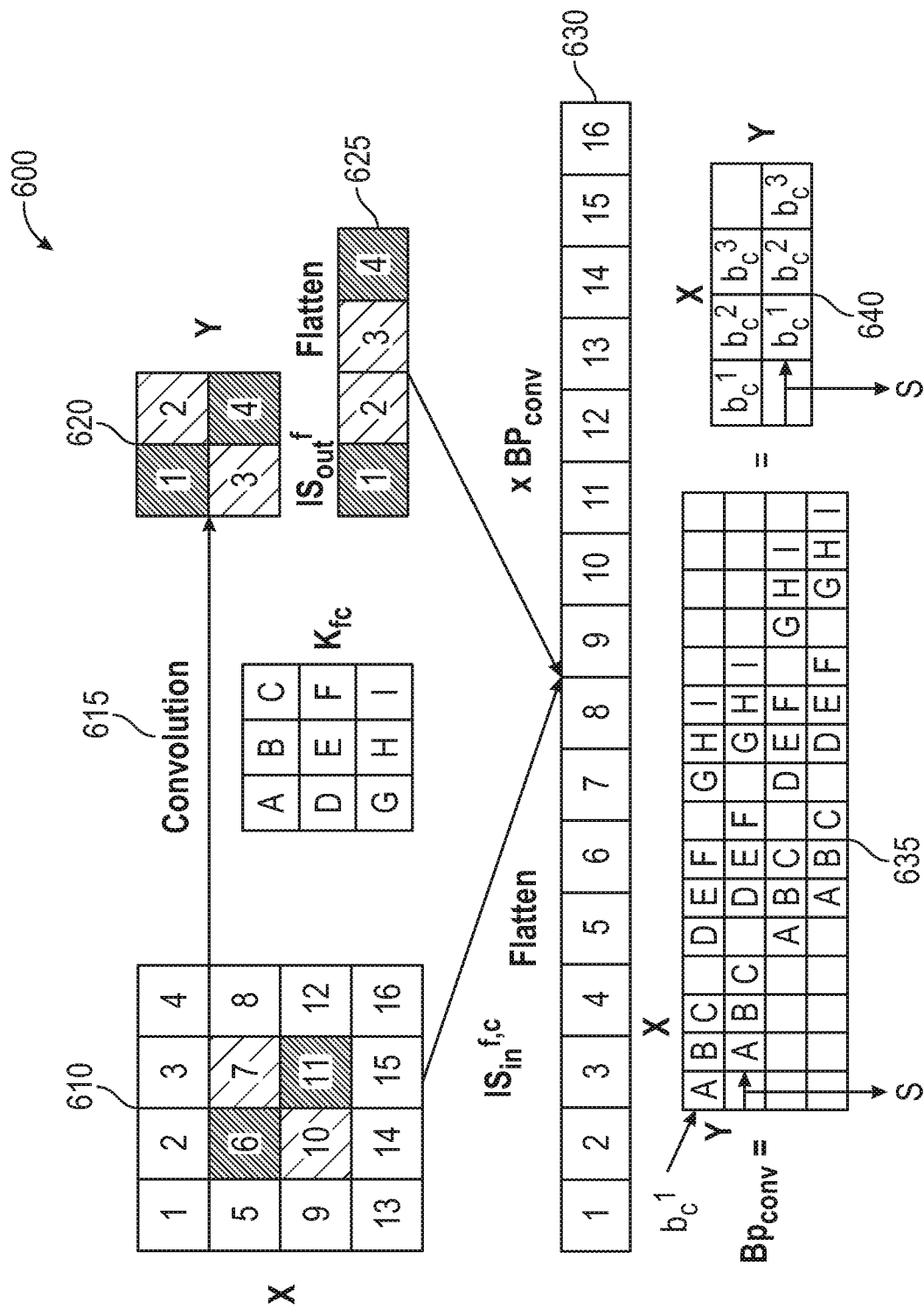
FIG. 6 illustrates a back propagation calculation of importance scores for a CNN, according to one embodiment described herein.

An example of such a back propagation calculation of importance scores is shown in FIG. 6. For purposes of this example, assume that X=4, Y=2, k=3, and s=1. As shown, the example 60 depicts an input matrix 610, having dimensions X×X, which is processed by a convolution kernel kf, 615 to produce an output matrix 620, having dimensions Y×Y. The output matrix 620 can then be flattened to produce the importance score vector 625. The DCNN optimization component 140 can use the back propagation matrix 635 to map the resulting importance score vector 625 back to the importance scores of the input layer 630. The DCNN optimization component 140 can use the matrix 640 to represent the mapping between a row in the output layer and a corresponding row in the input layer.

Additionally, the ISBP techniques discussed herein are intractable between the output response and the input one for ReLU layer and Dropout layer because the operations are nonlinear. In one embodiment, for a ReLU layer, since the ReLU operation is only conducted in isolation on a position without crossing channel or involving any other positions, the importance score can be back propagated through ReLU layer identically. Similarly, the identical importance score can be back propagated for the dropout layer, since all neurons share the same dropout possibility.

The descriptions of the various embodiments of the present invention are presented herein for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the present disclosure, reference is made to various embodiments. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the described aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   calculating a respective measure of importance for each of a plurality of elements within a convolutional neural network (CNN), comprising:
      computing a first measure of importance for an output element of the CNN; and
      computing a second measure of importance for a second element of the plurality elements by back propagating the first measure of importance based on a weight of a connection between the second element and the output element; and
   pruning one or more of the plurality of elements from the CNN, based on the calculated measures of importance.

2. The method of claim 1, wherein the CNN includes a plurality of output features, a plurality of neurons and a plurality of convolutional kernels, and wherein the one or more elements within the CNN further comprises at least one of the plurality of output features, the plurality of convolutional kernels, and the plurality of neurons for the CNN.

3. The method of claim 2, wherein the CNN further comprises a deep convolutional neural network (DCNN), wherein the plurality of neurons reside within in fully-connected layers of the DCNN.

4. The method of claim 1, wherein no further back propagation is performed relating to the pruned one or more elements within the CNN.

5. The method of claim 1, wherein back propagating the second one of the measures of importance through the CNN further comprises:
   selecting a technique for calculating the measure of importance for an upstream element of the CNN based on the second measure of importance, based on whether the relationship between a layer of the CNN on which the second measure of importance was calculated and the upstream layer is one of (i) a 1-way tensor to a 1-way tensor, (ii) a 1-way tensor to a 3-way tensor and (iii) from a 3-way tensor to a 3-way tensor.

6. The method of claim 5, wherein the relationship is determined to be a 1-way tensor to a 1-way tensor between fully connected layers of the CNN.

7. The method of claim 5, wherein the relationship is determined to be a 1-way tensor to a 3-way tensor between a fully connected layer of the CNN and a convolutional or pooling layer of the CNN.

8. The method of claim 5, wherein the relationship is determined to be a 3-way tensor to a 3-way tensor between a pooling layer or a first convolutional layer of the CNN and a second convolutional layer of the CNN.

9. A computer-readable storage medium containing computer program code that, when executed by operation of one or more computer processors, performs an operation comprising:
   calculating a respective measure of importance for each of a plurality of elements within a convolutional neural network (CNN), comprising:
      computing a first measure of importance for an output element of the CNN; and
      computing a second measure of importance for a second element of the plurality elements by back propagating the first measure of importance based on a weight of a connection between the second element and the output element; and
   pruning one or more of the plurality of elements from the CNN, based on the calculated measures of importance.

10. The computer-readable storage medium of claim 9, wherein the CNN includes a plurality of output features, a plurality of neurons and a plurality of convolutional kernels, and wherein the one or more elements within the CNN further comprises at least one of the plurality of output features, the plurality of convolutional kernels, and the plurality of neurons for the CNN.

11. The computer-readable storage medium of claim 10, wherein the CNN further comprises a deep convolutional neural network (DCNN), wherein the plurality of neurons reside within in fully-connected layers of the DCNN.

12. The computer-readable storage medium of claim 9, wherein no further back propagation is performed relating to the pruned one or more elements within the CNN.

13. The computer-readable storage medium of claim 9, wherein back propagating the second one of the measures of importance through the CNN further comprises:
   selecting a technique for calculating the measure of importance for an upstream element of the CNN based on the second measure of importance, based on whether the relationship between a layer of the CNN on which the second measure of importance was calculated and the upstream layer is one of (i) a 1-way tensor to a 1-way tensor, (ii) a 1-way tensor to a 3-way tensor and (iii) from a 3-way tensor to a 3-way tensor.

14. The computer-readable storage medium of claim 13, wherein the relationship is determined to be a 1-way tensor to a 1-way tensor between fully connected layers of the CNN.

15. The computer-readable storage medium of claim 13, wherein the relationship is determined to be a 1-way tensor to a 3-way tensor between a fully connected layer of the CNN and a convolutional or pooling layer of the CNN.

16. The computer-readable storage medium of claim 13, wherein the relationship is determined to be a 3-way tensor to a 3-way tensor between a pooling layer or a first convolutional layer of the CNN and a second convolutional layer of the CNN.

17. A system, comprising:
   one or more computer processors; and
   a memory containing computer program code that, when executed by operation of the one or more computer processors, performs an operation comprising:
      calculating a respective measure of importance for each of a plurality of elements within a convolutional neural network (CNN), comprising:
         computing a first measure of importance for an output element of the CNN; and
         computing a second measure of importance for a second element of the plurality elements by back propagating the first measure of importance based on a weight of a connection between the second element and the output element; and pruning one or more of the plurality of elements from the CNN, based on the calculated measures of importance.

18. The system of claim 17, wherein the CNN includes a plurality of output features, a plurality of neurons and a plurality of convolutional kernels, and wherein the one or more elements within the CNN further comprises at least one of the plurality of output features, the plurality of convolutional kernels, and the plurality of neurons for the CNN, wherein the CNN further comprises a deep convolutional neural network (DCNN), wherein the plurality of neurons reside within in fully-connected layers of the DCNN.

19. The system of claim 17, wherein no further back propagation is performed relating to the pruned one or more elements within the CNN, and wherein back propagating the second one of the measures of importance through the CNN further comprises:

selecting a technique for calculating the measure of importance for an upstream element of the CNN based on the second measure of importance, based on whether the relationship between a layer of the CNN on which the second measure of importance was calculated and the upstream layer is one of (i) a 1-way tensor to a 1-way tensor, (ii) a 1-way tensor to a 3-way tensor and (iii) from a 3-way tensor to a 3-way tensor.

20. The system of claim 19, wherein the relationship is one of:
a 1-way tensor to a 1-way tensor between fully connected layers of the CNN,
a 1-way tensor to a 3-way tensor between a fully connected layer of the CNN and a convolutional or pooling layer of the CNN, or
a 3-way tensor to a 3-way tensor between a pooling layer or a first convolutional layer of the CNN and a second convolutional layer of the CNN.

* * * * *